US005108647A

United States Patent [19]

Bölsing

[11] Patent Number: 5,108,647

[45] Date of Patent: Apr. 28, 1992

[54] METHOD OF DEHALOGENATING HALOGENATED HYDROCARBONS

[76] Inventor: Friedrich Bölsing, Danziger Strasse 5, D-3067 Lindhorst, Fed. Rep. of Germany

[21] Appl. No.: 679,159

[22] Filed: Mar. 26, 1991

Related U.S. Application Data

[63] Continuation of Ser. No. 328,199, filed as PCT/DE87/00433, Sep. 23, 1987, abandoned.

[30] Foreign Application Priority Data

Sep. 24, 1986 [DE] Fed. Rep. of Germany ....... 3632363

[51] Int. Cl.[5] ............ C09G 3/00

[52] U.S. Cl. ............ 252/182.12; 210/751; 210/909; 568/774; 570/204; 585/400

[58] Field of Search ............ 252/182.12; 210/751, 210/909; 585/400; 570/204; 568/774

[56] References Cited

U.S. PATENT DOCUMENTS

| | | | |
|---|---|---|---|
| 4,060,562 | 11/1977 | Wedemeyer et al. | 568/774 |
| 4,186,040 | 1/1980 | Aron et al. | 149/19.4 |
| 4,327,027 | 4/1982 | Howard et al. | 568/755 |
| 4,337,368 | 6/1982 | Pytlewski et al. | 568/774 |
| 4,350,598 | 9/1982 | Bölsing | 210/751 |
| 4,430,208 | 2/1984 | Pytlewski et al. | 210/909 |
| 4,477,357 | 10/1984 | Sittenfield | 210/748 |
| 4,483,716 | 11/1984 | Heller | 210/924 |
| 4,488,971 | 12/1984 | Bölsing | 210/751 |
| 4,574,013 | 3/1986 | Peterson | 134/2 |
| 4,632,742 | 12/1986 | Tundo | 210/909 |
| 4,654,203 | 3/1987 | Maurer et al. | 423/240 |
| 4,675,464 | 6/1987 | Rogers et al. | 585/538 |
| 4,949,641 | 8/1990 | Sayles | 102/293 |

OTHER PUBLICATIONS

Chemistry and Technology of Lime and Limestone, 2nd Ed., Robert S. Boynton, John Wiley & Sons, 1980, pp. 424–426.

Organic Chemistry, Third Edition, James B. Hendrickson, Donald J. Cram, George S. Hammond, McGraw-Hill Book Company, pp. 393 and 458.

*Primary Examiner*—Edward A. Miller

*Attorney, Agent, or Firm*—Sprung Horn Kramer & Woods

[57] ABSTRACT

A method of dehalogenating a halogenated hydrocarbon in the presence of a nucleophilic reaction partner, comprising dispersing the halogenated hydrocarbon by chemical reaction (DCR), and dehalogenating the resulting finely dispersed reaction product by means of a strictly chemical conversion with the nucleophilic reaction partner at a temperature between ambient temperature and approximately 510° C.

15 Claims, No Drawings

METHOD OF DEHALOGENATING HALOGENATED HYDROCARBONS

This application is a continuation, of application Ser. No. 328,199, filed as PCT/DE87/00433, Dec. 23, 1987, now abandoned.

Halogenated hydrocarbons can cause environmental problems. This is especially true of such compounds as polychlorinated biphenyls, dibenzodioxins, dibenzofurans, and other polycyclic aromatics. These compounds can be present on their own, as contaminants in mineral oils either in themselves or dissolved in the soil, in the form for example of leakage, as accompanied by water leaking from stored wastes, or as contaminant in solids, especially asphaltic solids.

That compounds of this type can be safely burned at high temperatures, above 1200° C. for example, when the temperature ca be reliably maintained constant over a long stretch of the combustion process is known. Otherwise, halogenated dioxins or dibenzofurans can be created subject to the usual combustion conditions in the presence of certain educts, and the environment will be additionally contaminated.

That halogenated hydrocarbons can be dehalogenated with such metals as sodium and potassium is also known. The reaction is carried out at high temperatures, with molten sodium in the form of a suspension for example.

Halogenated hydrocarbons present as contaminants in the soil can be expelled in rotating tubular kilns The resulting gas is fed to high-temperature combustion equipment or condensed. The halogenated hydrocarbons present in the condensed phase can then be subjected to a conventional dehalogenation reaction.

The organic-chemistry literature describes a number of dehalogenation reactions, all of which require that the materials involved be pure. Pure halogenated hydrocarbons can be relatively simply dehalogenated by treating them with hypophosphoric acid in the presence of palladium catalysts. This method, however, fails when even traces of contamination are present in the medium. It will accordingly be appreciated that these methods are practically useless in relation to environmental protection, which involves mixtures with components that rapidly poison the requisite catalysts.

A method with the characteristics of the preamble to claim 1 is described in EPA 0 188 718. Prior to being subjected to the known methods, the halogenated hydrocarbons are chemically and thermally split with a dehalogenation catalyst, and the known catalyst is a mixture of calcium oxide and/or calcium hydroxide and iron oxide. The pyrolytic decomposition of the halogenated hydrocarbons in this method requires reaction temperatures in the range of 600° to 800° C.

The aforementioned methods have considerable drawbacks. When the halogenated hydrocarbons are dehalogenated by a generally oxidative breakdown process, by combustion that is, uncommonly high temperatures are required. Methods of this type are accordingly very cost-intensive and entail the risk of creating highly toxic substances if the aforesaid overall conditions are not maintained. The chemical procedures that do not involve oxidative destruction all demand reaction partners and sometimes catalysts that are not adequate for highly contaminated mixtures or aqueous systems of the type involved in the aforementioned dehalogenation of chemically pure substances with molten metallic sodium, sodium alcoholates, or catalysts.

The known methods also entail the risk of creating such toxic successor products as dioxins or dibenzofurans from the initial halogenated hydrocarbons at the relatively high temperatures.

The object of the present invention is to provide a method of the aforesaid type that will not create toxic successors from the initial halogenated hydrocarbons.

This object is attained in accordance with the invention by a method which is based on the principle of dehalogenating the halogenated hydrocarbons by strictly chemical means and at low temperatures. To achieve this objective, the method in accordance with the invention commences with the dispersion by chemical reaction (DCR) of the halogenated hydrocarbon. This procedure ensures that the halogenated hydrocarbons that ar to be broken down will be freely accessible for the subsequent dehalogenation, whereby their chemical reactivity will be increased to the extent that they can be broken down by strictly chemical means and at very low reaction temperatures. The method being claimed employs temperatures between ambient temperature and 510° C., approximately half as high as those required by the aforesaid state of the art. This feature of the invention prevents the creation of undesirable highly toxic successors.

A large number of prior publications on the part of the present inventor in particular disclose that materials and mixtures of materials can be dispersed by chemical reaction. Dispersion by chemical reaction is a simple method of dispersing liquid materials and solutions of solid or liquid materials by a chemical reaction that promotes the formation of extensive surfaces and is the object of German Patents 2 053 627, 2 328 777, 2 328 778, 2 520 999, 2 533 789, 2 533 790, and 2 533 791 and their foreign (to Germany) equivalents, including U.S. Pat. Nos. 4,350,598 and 4,488,971. German Published Application 2 533 790 in particular describes a method of chemically dispersing a compound that forms a hydroxide in mineral oils and in substances that are similar to or contain mineral oils. This application, however, contains no intimation that halogenated hydrocarbons could also be subjected to a method of the type disclosed.

Some specific examples of the very many chemical reactions that satisfy the condition of expanding surfaces in the aforesaid sense and can accordingly be exploited for dispersion by chemical reaction are the conversion of calcium oxide into calcium hydroxide with water and the hydrolysis of aluminum alcoholates into aluminum hydroxide. The compounds present in the resulting finely dispersed solid preparations exhibit an especially high chemical reactivity. One of the advantages of dispersion by chemical reaction is that the reaction partners needed to carry out specific chemical reactions with the dispersed materials can be included in the dispersion. Both reaction partners will accordingly be in contact in a highly reactive form.

It is practical to employ nucleophilic reaction partners to dehalogenate halogenated hydrocarbons. When calcium oxide is employed as an educt (output material) to carry out the dispersion reaction, the result is a solid preparation with calcium hydroxide as a carrier. If the dispersing reactions are carried out involving halogenated hydrocarbons, the resulting calcium hydroxide will homogeneously contain the halogen compound.

Thus, both the halogen compound and the calcium hydroxide will be present in a highly reactive form. Hydroxyl ions are nucleophilic reaction partners. When the solid preparation is heated in a closed system, the halogenated hydrocarbon will be dehalogenated. A reaction temperature of only approximately 500° C. and a residence time of approximately one hour are needed. The codispersal of nucleophilic reaction partners of high reactivity, alcoholates for example, decreases the temperature in accordance with the structure of the alcoholate to approximately 300° C. When potassium hydroxide is measured into the water needed for the calcium oxide to react into calcium hydroxide, the reaction temperature can be decreased to approximately 400° C. subject to otherwise identical conditions. The relationships between residence time, reaction temperature, nucleophilic reactivity, and last but not least solvent that are generally known in chemistry prevail in this context. One of skill in the art can conduct simple tests to optimize the conditions with respect to whatever halogenated hydrocarbon is to be completely dehalogenated in conjunction with the most favorable educt and an especially effective nucleophilic reaction partner to ensure that dehalogenation can be concluded at the lowest possible temperature and in the shortest possible time. It is accordingly also absolutely possible to simply allow the finely dispersed reaction product to react in the presence of the nucleophilic reaction partner at ambient temperature until it dehalogenates.

When the nucleophilic reaction partner does not just develop out of the educt of the dispersion by chemical reaction as occurs with calcium hydroxide or magnesium hydroxide for example, the nucleophilic reaction partner is added and incorporated in a practical way into the dispersion by chemical reaction. Alcohols or amines are, in addition to the already mentioned alkali hydroxides and alcoholates, especially appropriate nucleophilic reaction partners. When such alcohols as diethylene glycol are present along with the potassium hydroxide, alcoholate ions that exhibit a high nucleophilic reactivity will form in equilibrium.

When heating is necessary to dehalogenate the halogenated hydrocarbons in the finely dispersed reaction product of whatever dispersion by chemical reaction is employed in the presence of the nucleophilic reaction partner, it is practical to carry it out in a closed reaction space to prevent the halogenated hydrocarbons from escaping before they are completely dehalogenated. To ensure complete reaction of the sometimes gaseous halogenated hydrocarbons with the solid reaction partners, it is recommended to keep the volume of gas as low as possible so that the reaction space will be as completely occupied by the finely dispersed reaction product and the nucleophilic reaction partners as possible. Dehalogenation can, however, also be carried out continuously in a fluidized bed or in a static-bed reactor with the resulting hydrocarbons being optionally returned to the bed from the solids as long as they still contain halogenated components.

Highly toxic materials that contain halogens can accordingly be absolutely simply and safely dehalogenated by means of the method in accordance with the invention and converted into substances with a low hazardous potential. Tetrachlorodibenzodioxin can for example be converted into dibenzodioxin, which is, in contrast to the former compound, definitely not ultratoxic but a relatively harmless material. It is, however, also possible to make the dehalogenation-successor products safe by conventionally burning the reaction product, the product of the dehalogenation, that is, and now of course in the form of a powder, in combustion equipment that operates at approximately 800° C. Since the successors will always burn readily, the aforesaid hazard to the environment will no longer occur.

Although calcium oxide in the form of the commercially available quicklime, fine white lime for example, is preferred for the purposes of the invention, coarser grades an be employed in many applications. The quicklime can contain up to 18% by weight of magnesium oxide or other foreign substances.

Hydrophobed calcium oxide can be used to "collect" halogenated contaminants in the soil. This adsorption or preliminary dispersal can be improved by adding asphaltic substances oar mineral oils, preferably in the form of waste.

The proportions in the following examples are all in parts by weight.

EXAMPLE 1

14 parts of polychlorinated biphenyls (PCB's) in the form of an industrially generated isomeric mixture are stirred together with 28 parts of calcium oxide. The addition of 10 parts of water initiates an exothermic dispersion by chemical reaction that results in a dry and powdered preparation. This material is heated to 510° C. in a closed tube and maintained at that temperature for 30 minutes. The result is 99.996% dehalogenation.

EXAMPLE 2

14 parts of a mineral oil contaminated with 10 000 ppm of polychlorinated biphenyls are dispersed by chemical reaction with 28 parts of calcium oxide and 10 parts of water with 1.4 parts of potassium hydroxide dissolved in it. Subsequent to a reaction-product residence time of 30 minutes at 350° C., only 0.98 ppm of the polychlorinated biphenyls can be detected.

EXAMPLE 3

14 parts of a mineral oil contaminated with 10 000 ppm of polychlorinated biphenyls are dispersed by chemical reaction with 28 parts of calcium oxide and 10 parts of water with 1.4 parts of potassium hydroxide and 2 parts of a polyethylene glycol with a mean molecular weight of 400 dissolved in it. Subsequent to a reaction-product residence time of 30 minutes at 300° C., only 1.4 ppm of the polychlorinated biphenyls can be detected.

EXAMPLE 4

14.9 parts of a waste product containing mineral oil contaminated with 0.14 parts of polychlorinated biphenyls and with 0.9 parts of tetrachloroethane and obtained from a storage tank are dispersed by chemical reaction with 28 parts of calcium oxide and 10 parts of water with 1.4 parts of potassium hydroxide and 2 parts of a polyethylene glycol with a mean molecular weight of 400 dissolved in it. Subsequent to a residence time of 30 minutes in an autoclave at 350° C., no tetrachloroethane and only 0.9 ppm of the polychlorinated biphenyls can be detected.

EXAMPLE 5

14 parts of a waste material contaminated with 10 000 ppm of polychlorinated biphenyls in trichlorobenzene are dispersed by chemical reaction with 28 parts of calcium oxide and 10 parts of water with 1 part of calcium hydroxide dissolved in it. Subsequent to a residence time of 30 minutes in a static-bed reactor at 350° C. with all the other conditions identical, neither the polychlorinated biphenyls nor the trichlorobenzenes can be detected.

EXAMPLE 6

56 parts of a cohesive soil contaminated with 100 000 ppb of a mixture of chlorine-containing waste including more than 50% of hexachlorobenzene deriving from the production of plant-protection agents were thoroughly mixed in a screw reactor with 50 parts of hydrophobed calcium oxide in the presence of 18 parts of water. The organic contaminants picked up by the hydrophobic calcium oxide during the mixing process can accordingly be dispersed by chemical reaction. Subsequent to a reaction-mixture residence time of 30 minutes at 350° C. only 5.5 ppb of halogenated hydrocarbon can be detected.

When 1 part of potassium hydroxide, in the form of an aqueous solution for example, is added to this batch, the dehalogenation increases to 99.9973% and only 1.1 ppb of halogenated hydrocarbons are detectable subject to otherwise identical conditions.

EXAMPLE 7

56 parts of a sandy soil contaminated with 2 000 000 ppb of a mixture of chlorine-containing waste including more than 50% of hexachlorobenzene in addition to penta-, tetra-, and trichlorobenzene, variously chlorinated naphthalenes, and low levels of variously chlorinated dibenzodioxins derived from the production of plant-protection agents were mixed in a screw reactor with 50 parts of hydrophobed calcium oxide in the presence of 10 parts of a waste mineral oil. The organic contaminants picked up during the mixing process by the waste mineral oil can be dispersed in this form by chemical reaction when 18 parts of water are added. The reaction mixture is maintained at 350° C. for 30 minutes. Only 2.0 ppb of halogenated hydrocarbons can be detected.

Almost the same result can be obtained by initially dispersing by chemical reaction waste mineral oils, asphaltic wastes, used bleaching clay contaminated with almost nonvolatile organic substances, or other materials that accept the halogenated hydrocarbons in solution, or, like hydrophobed calcium oxide, adsorptively bind the nucleophilic reaction partners and make them optimally accessible, by then mixing the likewise hydrophobic product of the dispersion by chemical reaction with the contaminated soil, sand, or other materials, and by then heating them to the requisite temperature for the requisite length of time. The soil, sand, or other material must be almost dry.

The soils and sands decontaminated in accordance with the invention can be very widely employed as subsoils and fillers in landscaping because they will not release any remaining traces of contaminated substances into the environment. This is especially true when the soils are compacted while being installed.

It will be understood that the specification and examples are illustrative but not limitative of the present invention and that other embodiments within the spirit and scope of the invention will suggest themselves to those skilled in the art.

What is claimed is:

1. A method of dehalogenating a highly toxic aromatic material that contains halogen, including compounds such as polychlorinated biphenyl, dibenzodioxins, dibenzofurnas and other such polycyclic aromatics, in the presence of a nucleophilic reaction partner, comprising dispersing the halogenated hydrocarbon by chemical reaction (DCR), and dehalogenating the resulting finely dispersed reaction product by means of chemical reaction with the nucleophilic reaction partner at a temperature between ambient temperature and approximately 510° C.

2. A method according to claim 1, wherein the highly toxic aromatic material that contains halogen, is dispersed by chemical reaction in the presence of the nucleophilic reaction partner.

3. A method according to claim 1, wherein the nucleophilic reaction partner is derived from the educt of the dispersion by chemical reaction.

4. A method according to claim 3, wherein the nucleophilic reaction partner is calcium hydroxide derived from calcium oxide as the educt of the dispersing chemical reaction.

5. A method according to claim 1, wherein the nucleophilic reaction partner is an alkali hydroxide, alkali alcoholate, alkaline-earth hydroxide, alcohol or amine.

6. A method according to claim 1, wherein the finely dispersed reaction product is heated to precisely the requisite dehalogenation temperature as rapidly as possible in the presence of the nucleophilic reaction partner.

7. A method according to claim 1, wherein the dehalogenation is effected in a closed reaction space.

8. A method according to claim 7, wherein the reaction space is occupied as completely as possible by the finely dispersed reaction product and the nucleophilic reaction partner.

9. A method according to claim 1, wherein the dehalogenation is carried out discontinuously in an autoclave.

10. A method according to claim 1, wherein the dehalogenation is carried out continuously in a fluidized-bed or static-bed reactor.

11. A method according to claim 1, wherein the dispersion by chemical reaction and the dehalogenation are carried out in the same step.

12. A method according to claim 1, wherein the highly toxic aromatic material that contains halogen, is a polychlorinated aromatic.

13. A method according to claim 12, wherein the polychlorinated aromatic is a chlorinated biphenyl or chlorinated dioxin.

14. A method according to claim 1, wherein the highly toxic aromatic material that contains halogen, is provided as a contaminated oil, sludge, slick or soil.

15. The method according to claim 13, wherein the highly toxic aromatic material that contains halogen, is mixed with calcium oxide, water is added in an amount to maintain the mixture dry and powered and the mass is heated to about 510° C. for a time sufficient to effect dehydrohalogenation.

* * * * *